(12) United States Patent
Kim et al.

(10) Patent No.: US 6,305,812 B1
(45) Date of Patent: Oct. 23, 2001

(54) BACK LIGHT UNIT FOR LIQUID CRYSTAL DISPLAY DEVICE

(75) Inventors: Youn Ho Kim, Ich'on; Pyung Yong Lee, Taegu, both of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/208,939

(22) Filed: Dec. 10, 1998

(30) Foreign Application Priority Data

Dec. 17, 1997 (KR) .................................................. 97-70133

(51) Int. Cl.[7] ...................................................... F21V 8/00
(52) U.S. Cl. ................................................. 362/31; 362/26
(58) Field of Search ........................... 362/26, 31, 331; 349/58, 62, 64, 65

(56) References Cited

U.S. PATENT DOCUMENTS

| | | | |
|---|---|---|---|
| 4,729,185 | 3/1988 | Baba | 40/546 |
| 5,335,100 | * 8/1994 | Obata | 362/27 |
| 5,596,429 | 1/1997 | Kokawa et al. | 349/67 |
| 5,654,779 | 8/1997 | Nakayama et al. | 349/58 |
| 5,729,310 | * 3/1998 | Horiuchi et al. | 349/62 |
| 5,774,199 | 6/1998 | Ozawa | 349/149 |
| 5,999,238 | * 12/1999 | Ihara | 349/58 |

FOREIGN PATENT DOCUMENTS

| | | | |
|---|---|---|---|
| 4-81123 | 7/1992 | (JP) | . |
| 05203949 | 8/1993 | (JP) | G02F/1/1335 |
| 06034928 | 2/1994 | (JP) | G02F/1/13 |
| 06138458 | 5/1994 | (JP) | G02F/1/1335 |
| 08007624 | 1/1996 | (JP) | F21V/8/00 |
| 08315618 | 11/1996 | (JP) | F21V/7/12 |
| 09178948 | 7/1997 | (JP) | G02B/6/00 |
| 09203811 | 8/1997 | (JP) | G02B/6/00 |
| 09211234 | 8/1997 | (JP) | G02B/6/00 |
| 10153775 | 6/1998 | (JP) | G02F/1/1335 |
| 10161118 | 6/1998 | (JP) | G02F/1/1335 |

* cited by examiner

Primary Examiner—Y. Quach
(74) Attorney, Agent, or Firm—Ladas & Parry

(57) ABSTRACT

Disclosed is a back light unit for liquid crystal display device (LCD). The back light unit for LCD includes a lamp reflector reflecting a lamp light toward a light guiding plate and directly fixed with screws to protrued parts of the light guiding plate which is substituting for mold frame; a reflecting sheet, a diffusing sheet and upper and lower prism sheets attached directly to the light guiding plate by means of a double stick tape respectively; and guiding ribs serving as assembly base formed on each corner of the light guiding plate.

4 Claims, 5 Drawing Sheets

BACK LIGHT UNIT FOR LIQUID CRYSTAL DISPLAY DEVICE

BACKGROUND OF THE INVENTION

1. Field of the Invention

The present invention relates to a back light unit for liquid crystal display device, more particularly to a back light unit having a light guiding plate substituting for a mold frame.

2. Description of the Related Art

Liquid crystal display (LCD), as the visual graphic display devices, involves a small device size and lower power consumption comparable to other display devices such as CRT. The LCD requires a light source in addition to its liquid crystal screen since the LCD is not a self-luminous device.

Currently, lamp such as CCLF and HCFL has been used as a light source for LCD. The back light unit can be divided into the lower part lighting type and the edge lighting type according to location of the lamp. In the lower part lighting type, a lamp light is uniformed by a diffusing sheet and then emitted into liquid crystal panel. On the other hand, A lamp light of the edge lighting type becomes at first a sheet-type light source through a light guiding plate.

FIG. 1 is a drawing for illustrating a conventional edge—light type back light unit. Referring to FIG. 1, a lamp 1 as a light source is surrounded by a lamp reflector 2. A light guiding plate 3 in which a reflected light is scattered and uniformed, is disposed on one side of the lamp 1. Optical sheets consisting of a diffusing sheet 5 and a lower prism sheet 6 and an upper prism sheet 7 are disposed on the upper plane of the light guiding plate 2 and a reflecting sheet is disposed on the lower plane of the light guiding plate 3.

The diffusing sheet 5 is arranged for improving the uniformity of incident light on a liquid crystal panel (not shown). The reflecting sheet 4 is arranged for avoiding the light leakage toward the lower of the light guiding plate 3 and reflecting the light perpendicularly to the upper of the light guiding plate 3. The lower and upper prism sheets 6 and 7 are arranged for converting the light travel path and are comprised of a sequence of troughs in the shape of triangle or hemisphere. To protect the shape of the lower and upper prism sheet 6 and 7 a protecting sheet 8 is disposed on the upper prism sheet 7. The liquid crystal panel is disposed on the protecting sheet 8.

Every constituents of the above back light unit are to be fixed on a mold frame 9 which acts as a supporting structure and is formed by the injection molding method. There are four guiding ribs(not shown) acting as assembly bases for the above sheets on the corners of the mold frame 9. Each sheet is inserted within the guiding ribs and then attached to the mold frame 9 by an adhesive tape. Also, the mold frame 9 has mounting holes(not shown) for fixing the entire liquid crystal module into a monitor frame.

In the back light units as described above, the light emitted from the lamp 1 is reflected by the lamp reflector 2, and then images on the display screen is displayed by the lights passing through the light guiding plate 3 and the diffusing sheet 5. Especially, the light emitted from the lamp 1 is prevented from external leakage by the reflecting sheet 4 and then is irradiated toward the light guiding plate 3. Then the light becomes uniform by the diffusing sheet 5 and is directed toward perpendicularly to the liquid crystal panel with converting the light travel path with a selected angle while passing the lower and the upper prism sheets 6 and 7.

As back light units become thinner and lighter, there have been proposed various studies for reducing the thickness of liquid crystal module. However among those back light unit components, the thicknesses of optical sheets and light guiding plate affect the device's optical capability, thus it may impossible to reduce below certain limit. Consequently, there have been proposed various method for reducing thickness of mold frame which has no relation with device's optical capability. If the thickness of mold frame is reduced below certain limit, the injection molding is very difficult to perform and the supporting function thereof is deceased.

SUMMARY OF THE INVENTION

Accordingly, it is an object of the present invention to provide a back light unit capable of reducing thickness and weight by substituting a light guiding plate, which is the thickest constituent for the back light unit, for a mold frame.

So as to achieve the object as above, a back light unit according to the present invention has the following constituents.

A lamp as a light source is disposed on one side of a light guiding plate. A lamp reflector surrounding the lamp reflects a light emitted from the lamp toward the light guiding plate. A reflecting sheet is disposed on the lower of the light guiding plate for preventing the light leakage toward the lower of the light guiding plate and for reflecting the light toward perpendicular to the upper of the light guiding plate. Optical sheets are disposed on the upper of the light guiding plate for uniforming the light and converting the light travel path so as to direct the light toward perpendicular to a liquid crystal panel.

Four guiding ribs protruded toward upside are formed each corner of the upper plane of the light guiding plate. The optical sheets is laid on the light guiding plate with guiding by the guiding ribs and then is attached on the light guiding plate by menas of a double stick tape. A couple of protruded parts are extended to be formed at each corner of the one side of the light guiding plate and then is secured both sides of the lamp reflector. Also, mounting holes for fixing the light guiding plate to a monitor frame is formed on the protruded parts, or a fixing rib extends from the corners of another side of the light guiding plate.

According to the present invention as described above, it is possible to reduce the thickness of back light units by substituting the lamp reflector, optical sheets and the reflecting sheet fixed to the light guiding plate for mold frame.

Hereinafter, a preferred embodiment of the present invention is described with reference to the attached drawings.

DETAILED DESCRIPTION OF THE PREFERRED EMBODIMENT

Figure 1:
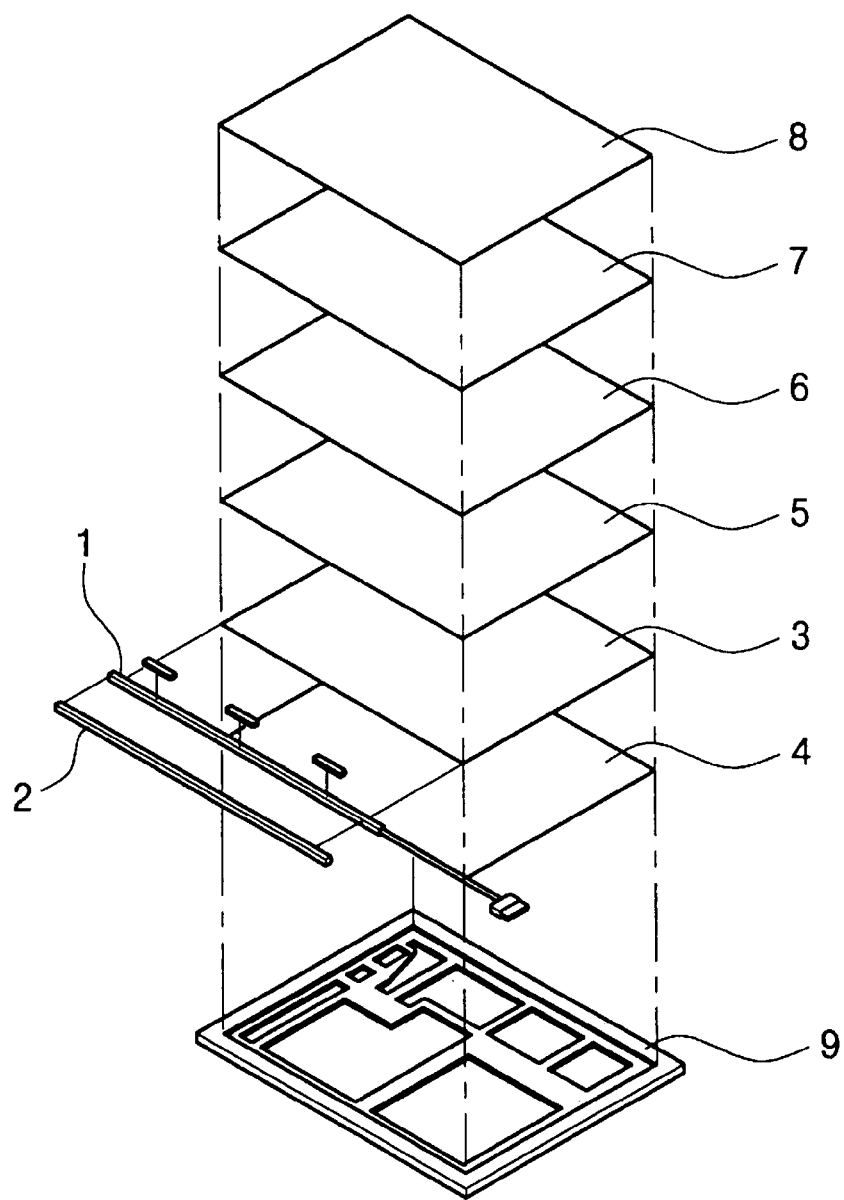
FIG. 1 is a fragmentary perspective view showing a prior art back light unit.
Figure 2:
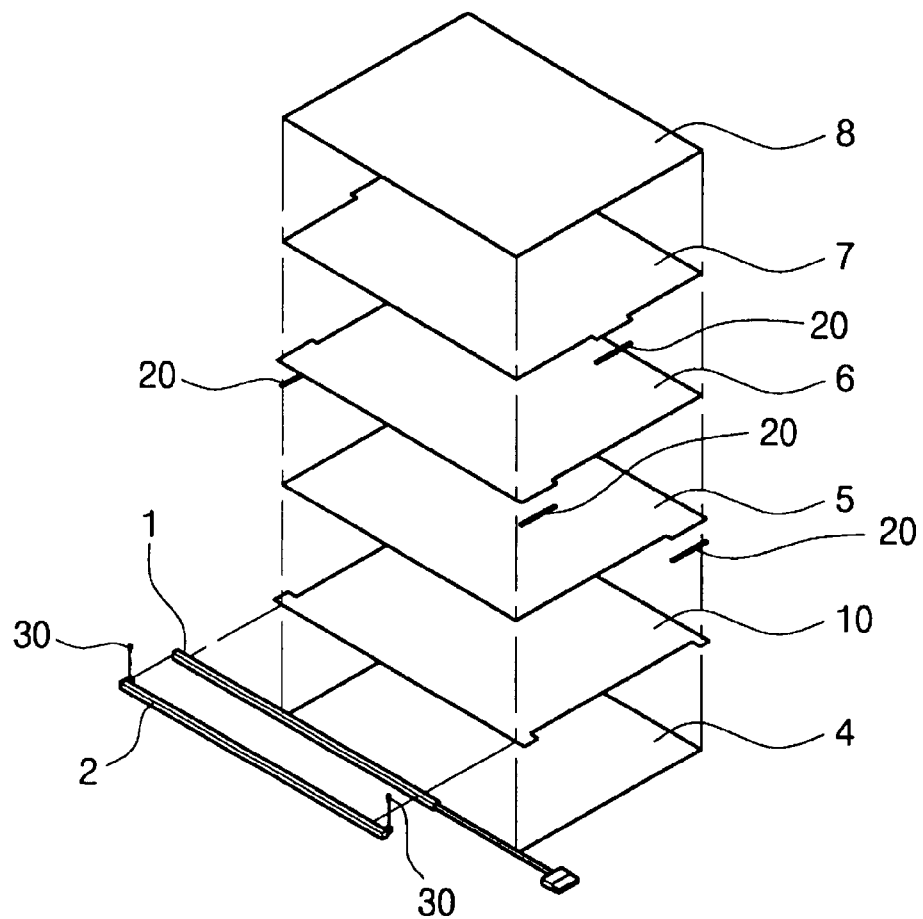
FIG. 2 is a fragmentary perspective view showing a back light unit of the present invention.

Referring to FIG. 2, a mold frame is removed and replaced by a light guiding plate 10 in accordance with the present invention.

A lamp 1 as a light source is disposed on one side of a light guiding plate 10 and also is disposed within a lamp reflector 2 reflecting a light emitted from the lamp 1 toward the light guiding plate 10. Both ends of the lamp reflector 2 are directly fastened with screws 30 respectively both edges of upper and lower parts of the one side of the light guiding plate 10.

Further, a reflecting sheet 4 is attached to the lower plane of the light guiding plate 10 with a double stick tape 20, which prevents the light leakage toward the lower of the light guiding plate and reflects the light toward perpendicularly the upper of the light guiding plate 10. Optical sheets are attached with a double stick tape 20 on the light guiding plate 10. The optical sheets are constituted of a diffusing sheet 5 uniforming an incident light, lower and upper prism sheets 6 and 7 respectively converting the light travel path into 90 degrees and 180 degrees so as to direct the light toward perpendicular to a liquid crystal panel and a protecting sheet 8 protecting the shape of the lower and the upper prism sheets 6 and 7, then those optical sheets 5,6 and 7 are arranged and directly attached to the light guiding plate 10 from bottom to top by that order with an adhesive tape 20. Following this method, FIG. 3 is a plane view showing the combination state that the lamp reflector 2 and those sheets 4,5,6,7 are directly attached to the light guiding plate 10.

As described above, the structures of conventional mold frame may employed for the light guiding plate 10 of the present invention so as to fix the lamp reflector 2 and those sheets 4,5,6,7 and 8 to the light guiding plate 10.

Figure 3:
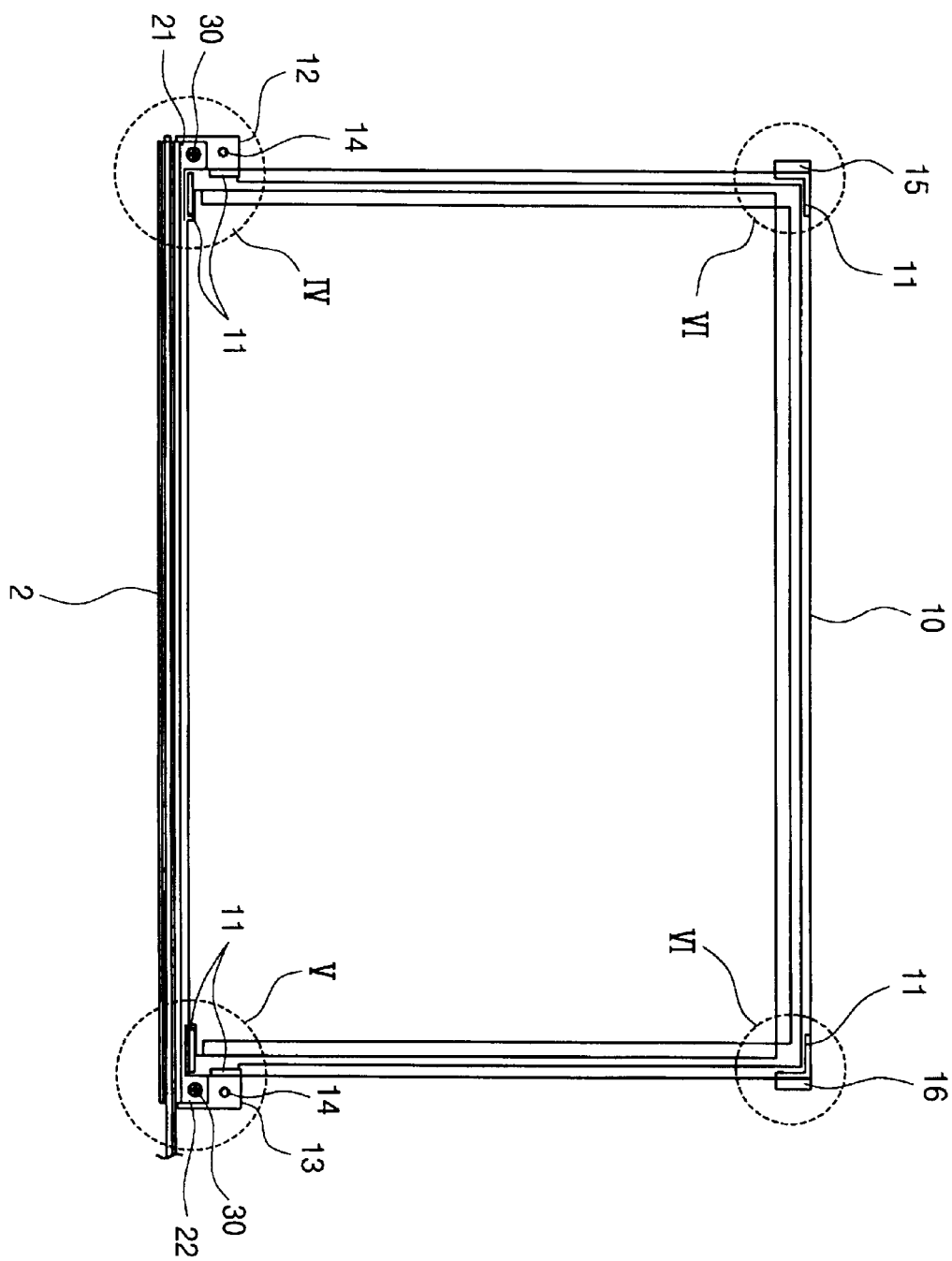
FIG. 3 is a plane view illustrating a combination state of a back light unit of the present invention.

Referring to FIG. 3, four guiding ribs 11 serving as assembly base are formed on the four corners of the upper plane of the light guiding plate 10. Each optical sheet 5, 6, 7 and 8 can be precisely fitted onto the light guiding plate 10 since those guiding ribs support the corners thereof. Also, two protruded parts 12 and 13 are formed on both corners of the one side of the light guiding plate 10 in the direction of the length of the lamp 1. The protruded parts 12 and 13 are faced with mounting parts 21 and 22 formed on both edges of the lamp reflector 2 respectively and then are fastened with screws 30. A couple of mounting ribs 15 and 16 to be inserted into a monitor frame are formed on both corners of another side of the light guiding plate 10.

Each corner of the light guiding plate 10 organized as above will be described more detail with reference to FIGS. 4, 5, 6 and 7.

Figure 4:
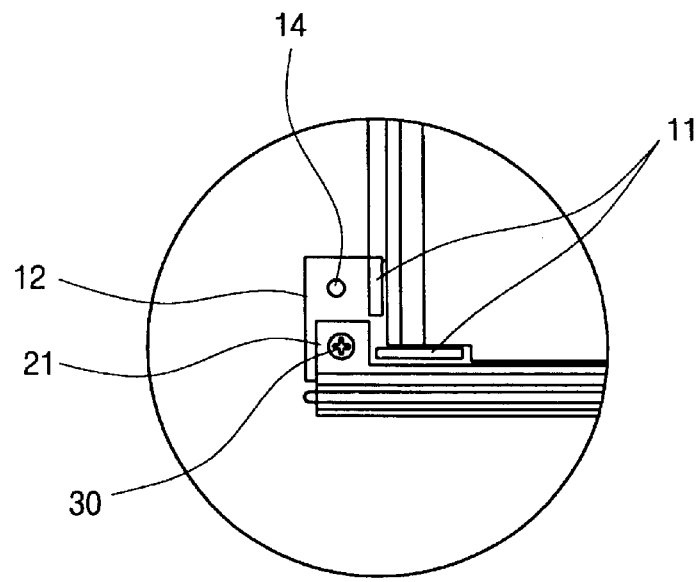
FIG. 4 is a sectional view for showing "IV" portion of FIG. 3.
Figure 5:
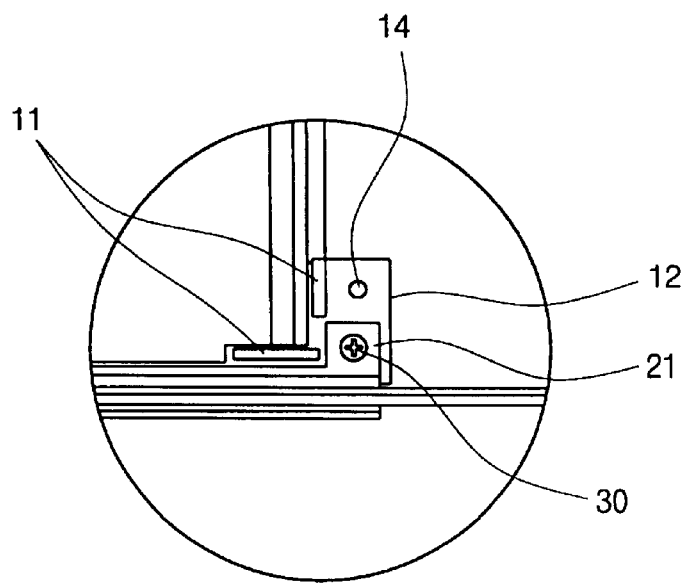
FIG. 5 is a sectional view for showing "V" portion of FIG. 3.

FIG. 4 and FIG. 5 illustrate both edges of a lamp-side of the light guiding plate 10. As shown in the drawings, two guiding ribs are formed respectively on the corner regions of the light guiding plate 10. The guiding ribs 11 are preferably separated couple, however, one-bodied guiding rib is also available. Two protruded parts 12 and 13 are formed on both edges of the light guiding plate 10. Here the protruded parts 12 and 13 are on the same plane as the light guiding plate 10. Mounting parts 21 and 22 formed on both edges of the lamp reflector 2 are fastened with the upper and lower plane of the protruded parts 12 and 13 by means of screws 30. Mounting holes 14 are formed on both protruded parts 12 and 13 for fixing the light guiding plate 10 to the monitor frame.

Figure 6:
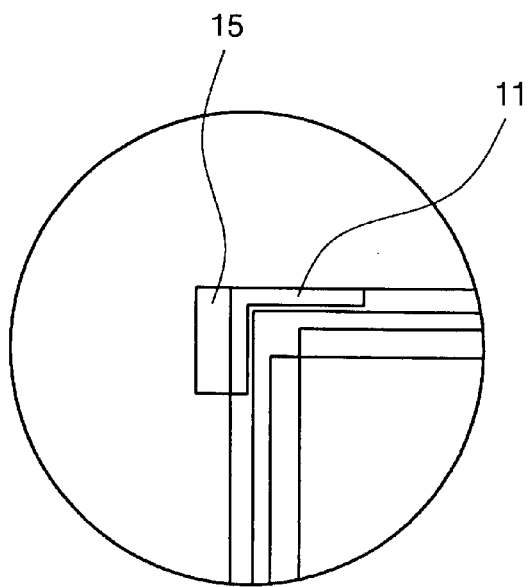
FIG. 6 is a sectional view for showing "VI" portion of FIG. 3.
Figure 7:
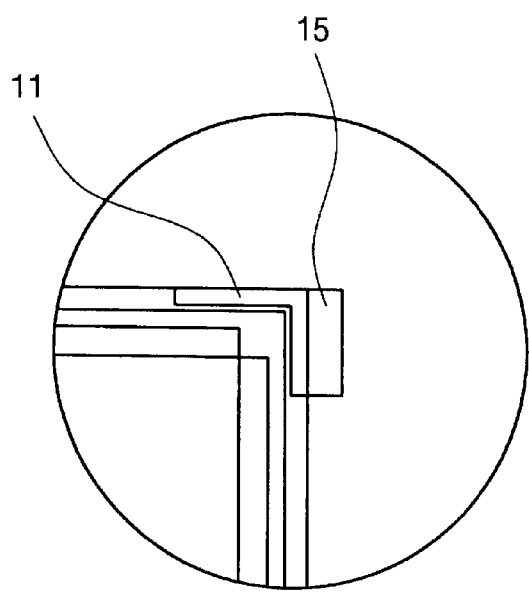
FIG. 7 is a sectional view for showing "VI" portion of FIG. 3.

FIG. 6 and FIG. 7 illustrate both corners of another side of the light guiding plate 10 which is opposite to the lamp 1.

As shown in FIG. 6 and FIG. 7, two guiding ribs 11 are formed on both corners of the light guiding plate 10. Here, the guiding ribs are perpendicularly crossed each other. A couple of mounting ribs 15 and 16 to be fitted into the monitor frame are formed on both edges of the light guiding plate 10 with the same direction of protruded parts 12 and 13.

As in the preferred embodiment of the present invention, to fix the light guiding plate 10 to the monitor frame, the mounting hole 14 is formed on each protruded part at both corners of one side of the light guiding plate 10 and a couple of mounting ribs fitted tightly into the monitor frame are formed on both corners of another side of the light guiding plate 10. It is also possible to form four protruded parts on each corner of the light guiding plate 10 and then to form the mounting holes on each protruded part. Otherwise, it is possible to form mounting ribs on each corner of the light guiding plate 10.

Therefore, the present invention provides a back light unit capable of reducing the thickness and the weight by employing a mold-frameless back light unit and by substituting a light guiding plate for mold frame.

Accordingly, the present invention is regarded as innovative that it enables liquid crystal modules involving ultralight and ultrathickness.

While only preferred embodiments have been discussed and described, it is obvious to those skilled in the art, various changes and modifications can be made without departing from the spirit and scope of the invention as defined by the following claims.

We claim:

1. A back light unit for a liquid crystal display ("LCD") comprising:

a lamp;

a light guiding plate provided with the lamp on one side thereof and adapted to be directly fixed to a monitor frame;

a lamp reflector having two edges which are fixed to an upper and a lower of a one side of the light guiding plate and surrounding the lamp so that a light emitted from the lamp is reflected toward the light guiding plate;

a reflecting sheet attached to the lower of the light guiding plate for preventing a light leakage toward the lower of the light guiding plate and reflecting the light toward the upper of the light guiding plate; and a plurality of optical sheets attached to the upper of the light guiding plate for rendering the light uniform and converting the reflected light so as to direct the light perpendicular to a liquid crystal panel which is formed on the light guiding plate, the light guiding plate having four corners and a guiding rib formed on each corner of the light guiding plate supporting each corner of each optical sheet.

2. The back light unit for an LCD of claim 1, wherein a couple of protruded parts are formed on the upper and the lower of the one side of the light guiding plate along the direction of length of the lamp respectively, and both ends of the lamp reflector are fasted with the protruded parts by means of screws.

3. The back light unit for an LCD of claim 2, wherein a couple of protruded parts are also formed on the other side of the light guiding plate and mounting holes are formed on the four protruded parts so as to fix the light guiding plate to the monitor frame.

4. The back light unit for an LCD of claim 2, wherein mounting holes for fixing the light guiding plate to the monitor frame are formed on each protruded part and a couple of mounting ribs fitted tightly into the monitor frame are formed on the other side of the light guiding plate.

* * * * *